Sept. 1, 1931.                    W. K. EDWARDS                    1,821,622
                                    TANK VALVE
                         Filed Oct. 25, 1929        2 Sheets-Sheet 2
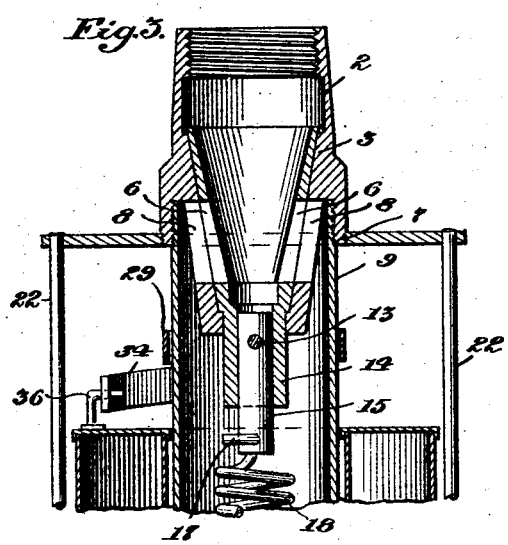
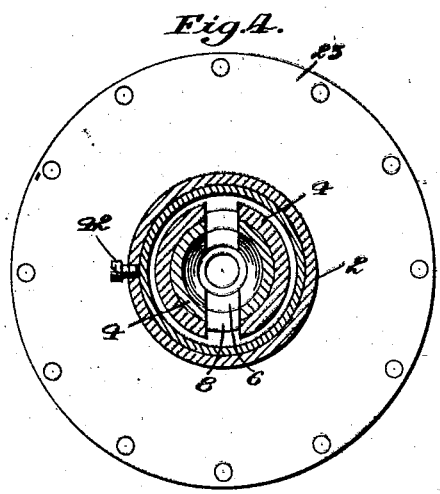
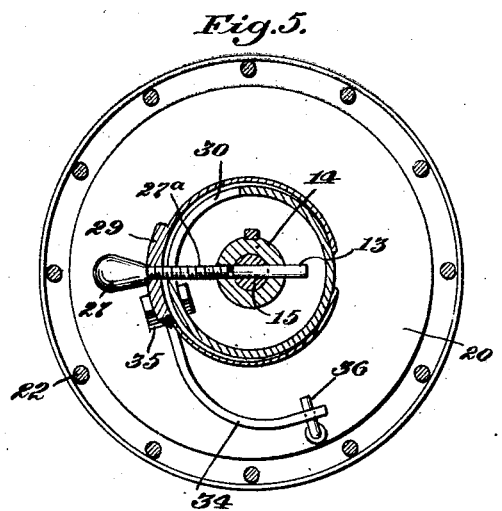

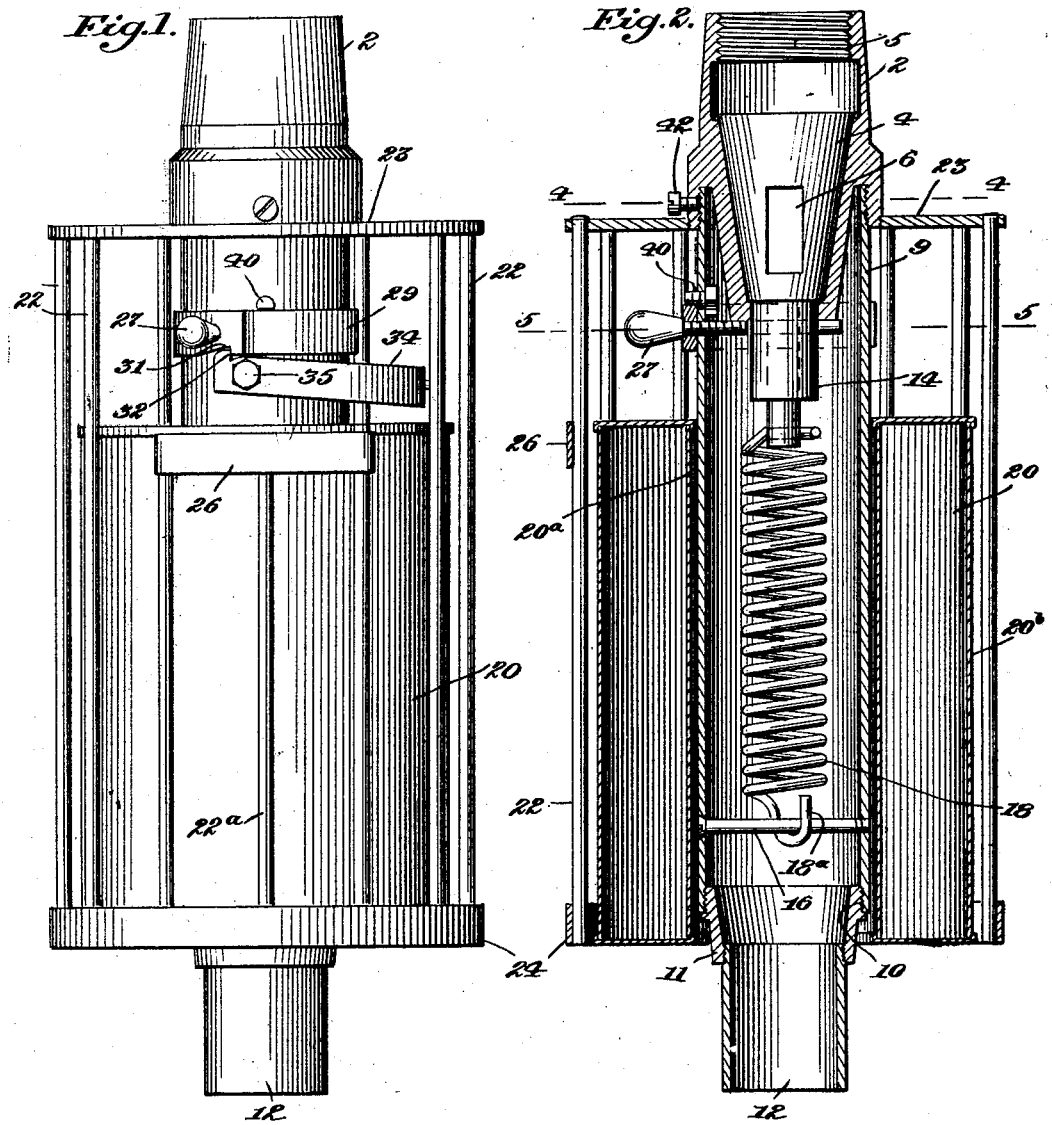

Patented Sept. 1, 1931

1,821,622

UNITED STATES PATENT OFFICE

WILLIAM K. EDWARDS, OF BIG SPRING, TEXAS

TANK VALVE

Application filed October 25, 1929. Serial No. 402,516.

This invention relates to valves for tanks, and in particular to valves controlling the admission of fluid to tanks which are being filled from remote points.

An important feature of the invention comprises a valve of the character referred to, which is located in the inlet conduit and is capable of being opened by manual means, and is retained in open position until the fluid reaches a predetermined level, whereupon a float operates to trip the valve locking devices, permitting the valve to close automatically, thus preventing overflow. Such valves are particularly useful in oil refineries in filling tank cars for shipment, but it will be obvious that the invention is not confined to this use, but may be advantageously employed for the automatic control of various liquids to storage tanks, or the like.

Other features and characteristics of the invention which distinguish it from similar devices will be understood from the following description of a preferred form of the invention, when considered in connection with the accompanying drawings, in which:

Fig. 1 shows a float-controlled valve structure embodying the invention, in side elevation; Fig. 2 is a vertical section through the same; Fig. 3 is a vertical section of the upper portion of the device taken at right angles to Fig. 2; Fig. 4 is a horizontal section on line 4—4, Fig. 2; and Fig. 5 is a section on line 5—5, Fig. 2.

The tank inlet coupling nipple 2 is provided with a tapering valve seat 3 within which is fitted the rotary, hollow, conical valve 4 having ports 6, situated at diametrically opposite points therein. The nipple 2 has an internal thread 5 for connection with the supply pipe for conveying fluid to the tank. Said nipple, which also constitutes the valve seat, has diametrically opposite ports 8 registering with the ports 6 in the valve, when the latter is open as shown in Figs. 3 and 4. The lower portion of the nipple is internally threaded at 7 to receive the externally threaded end of a tube 9. The lower end of this tube is threaded at 10 to a coupling member 11, the latter being in turn threaded to receive a discharge nozzle, or nipple 12.

The valve 4 has a tubular extension 14 within which is secured, as by a pin 13, a plug 15. A screw 16 is herein shown as extending across the lower portion of the tube 9, and a torsion spring 18 has a hook 18a formed as an extension of its lowermost coil, and which engages the screw 16, while the uppermost coil of the spring passes through a hole in the lower part of the plug 15, and is bent at 17 to prevent accidental detachment of the spring from the plug 15.

The actuating float 20 is formed as a cylinder, having inner and outer walls 20a, 20b, the inner wall fitting snugly about and telescoping over the tube 9, as the float rises and falls in response to changes of the level of liquid in the tank, the float being guided truly in its movements by the tube. The float is protected against accidental injury by a cage surrounding the float, and composed of a plurality of parallel rods or wires 22, the upper ends thereof being received in apertures through a disc 23, which is in threaded engagement with the nipple 2. The lower ends of the wires are seated in a ring 24, formed of a flat strip of metal and constituting the lower member of the cage for protecting the float, and other parts of the device enclosed by said cage. Preferably, a strip of metal 26 extends from one short wire 22a across to two wires on either side of the wire 22a so as to securely brace the wire 22a which is shortened in order to leave an open space for the manipulation of the operating handle 27. This handle is provided with a screw threaded extension 27a which extends through an aperture in a collar 29, partly surrounding the tube 9, and also is guided in an arcuate slot 30 in the tube. The inner end portion of the threaded extension is in threaded engagement with the tubular extension 14 of the valve, and upon movement of the handle 27 in a clockwise direction, as viewed in Fig. 5, the valve is closed.

The collar 29 has a notch 31 in its lower edge to engage a shoulder 32 on the end of a curved lever 34 which is pivoted at 35 to the tube 9. The free outer end of the curved lever 34 is provided with an aperture which receives a pin 36, extending upwardly from the float to which said pin is secured. As shown, that portion of the pin which passes through the hole in the end of the lever is bent angularly from the body of said pin. With the parts as described it will be seen that the float is connected through the pin 36 with the lever 34. A screw 40 is threaded through an aperture in the tube and its shank is flattened to engage and act as an abutment for the collar 29. With the parts as described it will be seen that the weight of the float is sustained by the lever 34, the short end of which is caused to bear upwardly by said float, against the collar, and this thrust upon the collar is sustained by the screw 40, which acts as an abutment as well as a guide for the collar.

By reason of the fact that the collar is connected through the threaded shank 27a of the operating handle to the valve, which latter has connection with the spring 18, the operation of the parts will be as follows:

The tendency of the spring being to hold the valve in closed position, with its ports 6 out of register with the ports 8 in the valve seat, when it is desired to admit liquid to the tank the handle 27 will be moved in a counterclockwise direction, from a position where the handle would be at the other extremity of the slot 30 from that shown in Fig. 5, to the position in which said handle appears in that figure, thus carrying the collar 29 to the point where the notch 31 engages with the shoulder 32 on the lever 34. Such movement of the valve places the spring 18 under tension, while the weight of the float holds the end of lever 34 in engagement with the notch in the collar. When the liquid in the tank rises to the point where the float is actuated the latter rises and rotates lever 34 so as to disengage the shoulder 32 from the notch in the collar, thus permitting the spring to react and rotate the valve 90 degrees, until its ports are out of register with those in the valve seat, thus cutting off the liquid supply to the tank. In the last position referred to the stem 27a will have been caused to travel from the position shown in Fig. 5 to the other extremity of the slot 30, being limited in its movements by the end wall of the slot. It will be seen that the operator by a quarter rotation of the valve moves it to open position, where it is retained through engagement of the shoulder 32 and notch 31, the lever 34 actuating as a latch to hold the valve in open position until the float reaches a point where it actuates this latch to release the valve, and the spiral spring then instantly closes it.

The device is very simple and reliable in operation, as in order to set it movement of the handle 27 a distance of 90 degrees only is required the latching lever being then automatically moved into locking position by the weight of the float. This places the spring 18 under tension, thereby exerting a yielding pressure to maintain the collar in locked relation to the latching lever until the latter is tripped by pressure exerted through the float, as the latter rises with the liquid in the tank.

I claim:

1. In a device of the class described, a combination of a liquid inlet conduit provided with a valve seat, a rotary valve therein, spring means normally acting to close said valve, manual means for opening the valve, a rotary collar actuated by said manual means, a latch constructed to engage and lock said collar when the valve is moved to open position thus storing up power in said spring means, and a float arranged for movements in response to differences in liquid level and to engage said latch upon rise of the liquid and trip the same, permitting the valve to close under the influence of said spring means.

2. In a device of the class described, the combination of an inlet coupling nipple containing a valve seat, a rotary valve fitted to said seat, a spring operatively connected with said valve to close same, a tubular member connected with said nipple and enclosing said spring, a float surrounding and guided by said tubular member and arranged for movements in response to differences in liquid level, a collar on said tubular member provided with a notch, a manually operable member rigidly connected with said collar and said valve, means for limiting the rotary movements of said valve, a latching lever constructed to engage the notch in said collar and hold the valve in open position, said lever being operatively arranged for actuation by said float as the latter rises to release said collar and permit the valve to close when the liquid reaches a predetermined level.

3. In a tank valve, the combination of a coupling nipple provided with a conical valve seat having ports, a hollow conical valve fitting within said seat and having aligning ports, a tube connected with said nipple and arranged to conduct the liquid from said valve to a container, a hollow float surrounding said tube and guided thereby, a torsion spring having one end connected with said valve and its opposite end anchored within said tube and normally acting to move said valve to closed position with its ports out of register with the ports in the valve seat, a collar movable about said tube and provided with a notch, an operating handle connecting said collar with said valve, a latching lever pivotally mounted in position to engage said notch when the handle moves said valve to open position thereby storing up power in said spring, said latching lever having its free end above said float and arranged for actuation thereby to release the collar and permit said valve to close under the influence of its spring when the liquid in the container reaches a predetermined level.

4. In a tank valve, the combination of an inlet pipe coupling member having a conical valve seat therein provided with ports, a hollow conical valve provided with ports and fitting said seat, a tube connected with said pipe coupling member and having a pin extending within the lower portion thereof, a torsion spring having its ends connected, respectively, with said valve and pin, a rotary collar on said tube provided with a notch, a handle connected with said collar and valve for simultaneous rotation of said parts, a latching lever pivoted to said tube below the collar, and arranged for engagement with said said notch to lock the valve in open position, and an annular float surrounding said tube and guided thereby, said float being arranged to rise with the liquid in a tank or container and actuate said latching lever to release the valve and permit the same to close under the influence of its spring when a predetermined liquid level has been reached.

In testimony whereof I have hereunto set my hand this 21st day of October, A. D. 1929.

WILLIAM K. EDWARDS.